United States Patent
White

(10) Patent No.: US 6,256,905 B1
(45) Date of Patent: Jul. 10, 2001

(54) CONTROLLED ATMOSPHERE SHIPPING/STORAGE SYSTEM AND METHOD

(76) Inventor: Galen White, 333 First Ave. W., Seattle, WA (US) 98119

( * ) Notice: Subject to any disclaimer, the term of this patent is extended or adjusted under 35 U.S.C. 154(b) by 0 days.

(21) Appl. No.: 09/503,047

(22) Filed: Feb. 11, 2000

Related U.S. Application Data

(60) Provisional application No. 60/119,883, filed on Feb. 12, 1999.

(51) Int. Cl.[7] ............................................ F26B 3/00
(52) U.S. Cl. .................. 34/467; 34/516; 34/218
(58) Field of Search ............................. 34/418, 419, 467, 34/516, 569, 218, 219, 220; 62/64, 70, 239; 426/412, 415, 419; 141/292, 98; 414/217, 287, 292

(56) References Cited

U.S. PATENT DOCUMENTS

| | | | |
|---|---|---|---|
| 4,434,623 | * | 3/1984 | Weasel, Jr. ................. 62/64 |
| 5,125,237 | * | 6/1992 | Saia, III et al. ............. 62/239 |
| 5,333,394 | * | 8/1994 | Herdeman et al. .......... 34/467 |
| 5,355,781 | * | 10/1994 | Liston et al. ............... 62/78 X |
| 5,437,837 | * | 8/1995 | Olson et al. ................. 422/3 |

FOREIGN PATENT DOCUMENTS

4120334  *  12/1992  (DE) ........................ 165/104.34

* cited by examiner

*Primary Examiner*—Stephen Gravini
(74) *Attorney, Agent, or Firm*—Robert B. Hughes; Hughes & Schact, PLLC

(57) ABSTRACT

A system for shipping perishable product in a controlled atmosphere environment, by means of various transport containers and/or vehicles. Quantifies of the product are placed in flexible containers or bags having a controlled atmosphere inlet and a gas outlet, to form shipping units. The shipping units are placed in a containing section of the transport vehicle or structure, and the individual shipping units are supplied with the controlled atmosphere gas from a suitable gas source or sources having a gas regulator or regulators. During shipment and storage, controlled atmosphere gas is directed into the shipping units as needed to maintain the proper atmosphere within the shipping units. When arriving at a destination, the quantities of perishable product are either removed from the shipping units, or kept in the shipping units for further storage and/or shipment.

46 Claims, 7 Drawing Sheets

CONTROLLED ATMOSPHERE SHIPPING/ STORAGE SYSTEM AND METHOD

RELATED APPLICATIONS

This application claims priority of U.S. Provisional Application Ser. No. 60/119,883, which was filed on Feb. 12, 1999.

BACKGROUND OF THE INVENTION

1. Field of the invention

The present invention relates to a system, method and apparatus for shipment/storage of perishable products, such as fresh vegetables and fruit, fresh fish, etc. in a controlled atmosphere environment, and more particularly to a novel method in which the controlled atmosphere is provided throughout the shipment and/or storage of the product, and the apparatus associated therewith.

2. Background Art

It has long been known that temperature, humidity and the composition of the surrounding atmosphere can effect the useful life of food products. Products that have benefited greatly using controlled atmosphere storage and controlled atmosphere transport include fruits, vegetables, orchids and flowers, meats, poultry, fish, and also grains and seed, among many others.

For many decades perishable food products (e.g. fresh meat) had been shipped in a refrigerated environment. When these have been shipped by rail, specially constructed refrigerated freight cars would be supplied with a quantity of ice periodically along the route to maintain the desired low temperature. Later, mechanical refrigeration units were supplied for freight cars, over the road trucks, trailers, etc.

With regard to the atmospheric conditions affecting the shelf life of such food products, it has long been known that with the use of "controlled atmosphere" techniques, the shelf life of fresh post-harvest product can by extended by two, or three times or more in comparison with the conventional air storage techniques, when used as a supplement to good temperature and humidity protocols. Also, it has been a practice to have fruits and vegetables ripen to an optimum point prior to sale in a controlled atmosphere and then shipped using controlled or conventional atmospheric techniques. The term "modified atmosphere" refers to replacement of ambient air with a particular gas mix, and then sealing the container holding the mixture. No further controls are generally employed to maintain this particular gaseous mix.

The controlled atmosphere process in one where gas replacement of ambient air is accomplished in a similar manner to modified atmosphere. However, there is a mechanism to continually refresh the gas mix so that the levels don't fall out of proper proportions due to biochemical and enzymatic reactions between the gases and the product being housed. The continual modification is termed "controlled atmosphere".

The controlled atmosphere process usually involves reducing the oxygen level in the immediate environment to inhibit oxygen loving and putrefying bacteria as well as the chemical oxidation processes. Controlled atmosphere techniques are commonly used to store vegetables and fruits in warehouses over many months. Without controlled atmosphere techniques in such warehouses, the product would perish quickly and all consumption would be seasonal only.

Ambient air is generally about 0.3% $CO_2$, 20% $O_2$ and 78% $N_2$ with remaining 1.7% comprised of many other gases. Generally, the gas environment used in controlled atmospheric techniques is composed of $CO_2$, $O_2$, and $N_2$. The proportions (or partial pressures) for optimum storage periods differ depending on the product. For lettuce, it may be only 2% $CO_2$, 3% $O_2$ and 95% $N_2$. For cantaloupe it may be 18% $CO_2$, 5% $O_2$ and 70% $N_2$. For poultry it may be 95% $CO_2$, 1% $O_2$ and 4% $N_2$. For some fish it may be 85% $CO_2$, 5% $O_2$ and 10% $N_2$.

However, when the food products are enclosed, the natural bacteriological and chemical processes that occur can alter the atmosphere around the enclosed products greatly. For fruits and vegetables the ripening process is very active, and to maintain the desired atmospheric conditions, some actively produced $CO_2$ and ethylene must be constantly removed and regulated. For post-harvest meats, poultry and fish, there is less active emission of generated products, but the post-rigor breakdown of the protein and fats is hastened in the presence of high levels of $O_2$. Too little $O_2$, however, will provide a different set of concerns such as allowing the toxic anaerobic bacteria to potentially flourish. Thus, it is highly desirable to change the atmosphere for protein products due to bacteriological and chemical processes, and this can be accomplished by constant purging of the aged air, and replacement with new, properly proportioned gases.

Most packaging materials used in food manufacture such as corrugated cartons, sbs fiberboard, styrofoam and polyethylene bags have a porosity that enables the gradual exchange of gases. Therefore, product that has been prepared and packaged in a standard method and with standard materials is generally very amenable to the benefits of controlled atmosphere storage and shipping.

For these reasons, equipment has been developed to maintain a controlled atmosphere for such food products when these are being stored for extended periods of time, or when these are being shipped by boat. Thus, specialized ocean shipping containers have been developed.

Specialized ocean containers are boxes that measure approximately 40 feet long, 8 feet wide and 9 feet high. The containers are available uninsulated-insulated or insulated with refrigeration units. Some units are available that are half this size, or 20 feet long, 8 feet wide and 9 feet high. Some companies have altered insulated refrigerated containers to permit the infusion of alternative gaseous atmospheres, and displacement of an ambient air atmosphere. Additionally they have placed into the containers extra seals to prohibit rapid gas exchange with outside air or loss of the gas or mixture. Some of these altered, refrigerated containers are also altered to install a railing just inside the doors that accepts a plastic curtain which serves to provide an additional seal against gas exchange.

However, there is an expense in modifying the basic design to incorporate the controlled atmosphere system, and one effect of this is that obtaining such specialized containers in a routing system used by shipping companies is often a time consuming process and can cause significant delays to acquire such containers. Normally, these are not used in routes involving most ports world wide, but instead are cycled in routes that are centers for fruit and vegetable production. Further, the controlled atmosphere techniques are often used in conjunction with refrigeration of the containers. All ocean shipping containers that use refrigeration have periodic defrost cycles. The periodicity may be as often as four hours or can be every 24 hours. The defrost cycles raise the interior of the containers several degrees for several minutes. Even small temperature changes on products have deteriorating effects.

One specialized ocean shipping container is provided by Transfresh Corporation. This system provides a sealed container with gas ports. The required gas is injected into the container, and the container is then sealed. There are mechanical processes that remove undesired levels of some gases such as ethylene and carbon dioxide. The system is primarily passive and is not capable of maintaining high levels of $CO_2$ for meat, poultry and fish products over time. It functions primarily as a modified atmosphere control system as will be described below. This container requires that a plastic curtain be fitted into specialized tracks at the entrance (the back door), and the curtain must be removed to ventilate the container for access of the product.

Another ocean shipping container is manufactured by C. A. Global Express L. L. C. Their shipping container contains the gas cylinders, nitrogen systems and dispensing systems. It dispenses controlled levels of gaseous atmosphere to product held in sealed (transfresh- type) containers.

As another example, Carrier Transicold Corporation manufactures refrigerating systems, and modifies ocean shipping containers to provide these in somewhat the same manner as Transfresh Corporation. A nitrogen making module is placed in the container which allows the purging of unwanted levels of $CO_2$ buildup from product respiration. However, these containers do not measure levels of $CO_2$ above 25% which is often required for meat, poultry, and fish products.

In addition to the considerations of shipping the product in a controlled atmosphere environment, quite often when the product reaches the end destination, it is necessary to store it, either for local distribution at a later time or for further shipment. Thus, to continue the controlled atmosphere process, this generally requires a sealed room with proper ventilation equipment, oxygen masks for the workers, monitoring equipment and alarm systems. Another alternative is for the receiving party to maintain the product in a modified ocean shipping container at the destination location.

Generally, as indicated above, these specialized containers are sealed at the back wall, and a plastic curtain is placed over the entrance. Usually, the procedure to remove and replace the curtain takes a minimum of 20 minutes. The container would need to be evacuated of the high $CO_2$ gases before a person can enter, and the replacement of the controlled atmospheric gases afterwards would take some time and a considerable quantity of gas.

One alternative to using controlled atmosphere techniques for time consuming shipments is to use air freight service, and for some highly perishable products this is the only viable way to ship such products to or from remote locations. In many circumstances, however, there is no practical way to ship fresh product from the region because the air freight is too expensive or too limited. In Alaskan fishing ports, this condition is common. As an example, the largest fish port in the United States (Dutch Harbor, Ak.) has less than one percent of all products shipped fresh. The cost to fly the product to a distribution center such as Seattle is about 65 cents per pound versus about 12 cents per pounds by sea container. However, the time it takes to ship by sea (without controlled atmosphere techniques) causes the product to deteriorate too much for the market to accept, so freezing is required. Floral shipments from South America face similar problems and have the disadvantage of occupying a relatively large amount of space. When properly packaged, these require a substantial volume for little weight, and the cost of air freight for these flowers is very high.

Another method of controlling the atmosphere surrounding a perishable food product or the like is called "modified atmosphere packaging". This is done by packaging the product with the desired gaseous mixture within the package and then sealing the package. Recent developments have also included gas "scrubbers" that eliminate internal packaged quantities of $CO_2$ and $O_2$ and ethylene. These scrubbers help the product to maintain an optimum level of gas, but can only approximate it and are subject to the limits of the scrubbing devices.

A filling machine to accomplish the modified air packaging technique is manufactured by M-Tech Incorporated. This enables the user to place the product into a bag, draw a vacuum and fill the bag with the desired gas mixture, after which the bag is sealed. A similar system is provided by CVP Systems Incorporated.

Also, films have been developed to allow one way gas transmission, particularly $CO_2$ emissions from fruit and vegetable packaging. Again, these films help maintain a desired atmosphere, but usually with great tolerance in the gas proportions.

A search of the patent literature has disclosed a number of patents. These are as follows:

U.S. Pat. No. 5,529,178 (Gorlich) shows a gas tight shipping container in which a piece of meat is packaged. The air is replaced with the desired low oxygen content gas mix so that spoilage is retarded. In column 5, line 16, it is stated that it may be desirable to withdraw the low oxygen from the container at the point of sale, since if this is not done, the package with the low oxygen environment will cause the meat to have a purplish color. Therefore, in the supermarket, the upper permeable film 66 may be pealed back to allow the ambient atmosphere to enter the package so that the meat will take on a reddish color.

U.S. Pat. No. 5,501,525 (Cox et al) discloses a bag system for holding meat or other food products. In use, the bag is flushed of air, and a more preserving gas mix is pumped in. This container has an outer bag and an inner bag. This is described as "bone-guard" and has a puncture resistant inner bag for preventing bones and other sharp surfaces from penetrating the inner and outer bags.

U.S. Pat. No. 5,481,852 (Mitchell) discloses what is called a "method and apparatus to promote gas exchange from a sealed receptacle".

This patent is directed primarily toward a method of injecting the gas components into the bag in a particular manner and sequence to provide a sealed, packaged product with the desired atmosphere therein.

U.S. Pat. No. 5,389,036 (Halley) shows a storage vessel for storing grain. There is a gas impermeable enclosure having a water-vapor-permeable membrane to allow the grain to breathe and dry, and to prevent condensation and mold growth With the reduced oxygen concentration, any insect or other pests present in the grain will begin to use up the available oxygen until substantial anaerobic conditions are obtained to exterminate any living animals or organisms in the grain.

U.S. Pat. No. 5,261,532 (Fauci) shows a reusable plastic bag, and is directed toward a particular construction of the bag, particularly the vent tubes.

U.S. Pat. No. 4,572,360 (Lischka et al) discloses what is called a "herb package", and deals with the perforations in the pouch, some of these projecting outwardly, and some inwardly to act as valves for circulation of water.

The following patents disclose various features of possible interest.

U.S. Pat. No. 3,905,410 (Arato), shows a fluid shipping bag that is provided with a filling connection 2, and a vent 3.

U.S. Pat. No. 3,432,087 (Costello), shows a seal placed over a weak spot on a bag so that under high pressure material can flow out.

U.S. Pat. No. 3,371,985 (Wyka), shows a disinfecting system in which air flows from a mattress 4, through a container of chemical treatment material at 2, and is propelled back into the mattress 4.

U.S. Pat. No. 3,209,674 (Payne), shows a vat for fermenting pickles and the like with a cover that is provided with an over pressure relief valve and an access tube that can be closed when not in use.

U.S. Pat. No. 2,870,954 (Kulesza), shows a bag that is provided with a vacuum valve so that when the bag is exposed to a vacuum the air in it is withdrawn, and no new air can flow in.

U.S. Pat. No. 2,638,263 (Jesnig), shows a bag with an integral check valve through which air can be withdrawn.

U.S. Pat. No. 2,314,317 (Walter), shows a system in which dressed poultry is quick frozen. It is placed in a bag or wrapped and a pipe supplied with chilled air is placed in the cavity and a second tube that sucks out the air after it has chilled the poultry. In some embodiments there are several bags, each of which is provided with a cold air source, and suction pipe.

U.S. Pat. No. 1,119,986 (Pleger et al), provides a garment container that is shown with several means for providing fumigant to the garment. There is a pocket 15, in which material may be placed, or a bulb 19, can be provided to inject a treating chemical.

SUMMARY OF THE INVENTION

The system of the present invention provides a convenient, cost effective and economical way of transporting a perishable product by means of transportation vehicle, container or structure. Such vehicle containers or structures could include such things as a truck, a trailer, a semitrailer, a boat, a barge, a railroad car, an aircraft, a flatbed shipping structure or a shipping container or structure which is adapted for transport of cargo by one or more of the transportation devices noted above. In the method of the present invention, a quantity of the perishable product is placed in a controlled atmosphere container to provide a controlled atmosphere shipping unit comprising a controlled atmosphere container with the quantity of product therein. There is also provided a gas source of controlled atmosphere gas. In the preferred embodiment, there is a plurality of such shipping units that are shipped in a single transport container.

The shipping unit or units is or are located in the containing region of the transportation container, and controlled atmosphere gas is directed into the controlled atmosphere container to provide a desired controlled atmosphere environment for the quantity or quantities of product of the shipping unit or units. Then the transport container is transported to a destination location, with the shipping unit or units therein, while maintaining the desired control atmosphere environment in the containing unit or units.

With a plurality of shipping units being in the shipping region, in one form of the invention, a single gas source is utilized to direct controlled atmosphere gas through gas passageways to two ormore of the shipping units. Further, the flow of gas from the gas source is regulated to maintain the desired control atmosphere environment in the shipping units. Also desirably each shipping unit is provided with at least one pressure responsive gas outlet for each of the controlled atmosphere containers of the shipping units to discharge gas therefrom.

Also, the gaseous exhaust from the one or more shipping units may be monitored and the gas directed into the shipping units is regulated accordingly. In one preferred form of the present invention, gas regulation is accomplished at least in part by controlling quantities of gas components making up the controlled atmosphere gas directed into the shipping units, this being done to obtain a proper balance of gas components for the controlled atmosphere environment.

Also in a preferred form, the controlled atmosphere container has a base and a collapsible side wall portion. The base is placed on a pallet with the side walls being in a collapsed position. The quantity of product is placed on the base, and the side wall portion of the control atmosphere container is raised to enclose the quantity of product, and a closure section at the upper part of the side wall portion is closed to close a controlled atmosphere chamber of the shipping unit.

After arrival at the destination, the shipping unit or units is removed from the container region and the unit or units are located at one or more subsequent locations while maintaining a controlled air environment in the shipping unit. This may be accomplished by providing a source of controlled atmosphere gas at said subsequent location or locations and directing additional controlled atmosphere gas to the shipping unit or units as needed to maintain a desired controlled atmosphere environment in the shipping unit or units. During the time that the controlled atmosphere environment is maintained in the unit or units, gas is directed through a controlled atmosphere gas inlet in each shipping unit during one or more time periods and gas is discharged from the controlled atmosphere shipping unit through one or more outlet opening during one or more time periods to maintain a desired controlled atmosphere in the unit.

In a preferred form, the gas source further comprises a gas container and a gas regulation unit to regulate flow of gas from the gas container to the shipping unit. In one form there are two or more gas containers, each containing a gas component of a gaseous mixture which makes up the controlled atmosphere gas, and the gas regulating unit controls flow of the two or more gas components. Also, where there are two or more shipping units, the controlled atmosphere gas from the gas regulating unit is directed to such two or more shipping units. In one form of the invention, the plurality of shipping units are placed in the containing region and the gas source, comprising a gas container and a gas regulating unit is also placed in the shipping container and operatively connected with the shipping units. In another version, the gas source comprising the gas container and gas regulating unit is a component of the transportation container and is connected to the shipping units when they are located in the containing region, and disconnected from the shipping units removed from the containing region.

In the preferred form, the controlled atmosphere container is a flexible inflatable member, and the controlled atmosphere gas is directed into the controlled atmosphere container to inflate the controlled atmosphere container in a manner that the controlled atmosphere gas is adjacent to substantial outer surface portions of said quantity of product.

In operation, gas in the controlled atmosphere container is removed during one or more time periods through a pressure responsive discharge valve which permits discharge at a pressure higher than ambient pressure around the controlled atmosphere container. The controlled atmosphere gas is directed into the controlled atmosphere container to pressurize the controlled atmosphere container to a pressure above ambient pressure around the controlled atmosphere container. Also, in a preferred form there is a second pressure responsive discharge valve to permit discharge of gas therethrough at a pressure higher than the discharge pressure of the first mention discharge valve. Thus, if the first discharge valve blocks, then the second one would open, but at a higher pressure.

The method of the present invention also comprises the combination of steps and initially positioning and arranging the product in a manner to provide the controlled atmosphere environment for the product as described above so that the resulting shipping assembly is able then to move from the original destination toward the final destination while maintaining the controlled atmosphere environment in the shipping units.

The method of the present invention also comprises the combination of steps for receiving and disposition of the perishable product that is in the transport container when the transport container with the shipping units and the gas supply reaches a destination location.

When the transport container reaches the destination, a classification of the quantity of the product of the shipping unit related to the expected future handling of the quantity of the product and the time frame within which the handling takes place is made. The quantity of product is placed in one of two categories, namely:

a) a first category of a quantity of product not reasonably requiring further controlled atmosphere environment;

b) a second category of a quantity of product requiring continued presence in the controlled atmosphere environment.

The quantity of product in the first category is removed from the controlled atmosphere container while the quantity of product in the second category remains contained in the controlled atmosphere container. Either the presently used gas source can be utilized to maintain the controlled atmosphere environment, or another gas source could be utilized.

The present invention also comprises a shipping assembly for transporting the perishable product in a manner to provide a controlled atmosphere environment. This comprises the transport container, the controlled atmosphere shipping unit or units within the transport container, and also the gas source or sources of the controlled gas atmosphere, as described above. Other components of the assembly are described above.

Also, the present invention comprises the portable controlled atmosphere shipping container (desirably a flexible inflatable member), as described above, adapted for use in the method of the present invention. In a preferred form, there is a pressure responsive outlet as described above, and also a second pressure responsive gas outlet which is able to open in case the first outlet becomes blocked. Also, in the preferred form this container comprises a flexible inflatable member as described above.

Other features will become apparent from the following detailed description.

BRIEF DESCRIPTION OF THE DRAWINGS

FIG. 7a shows a system where there is a plurality of pressurized supply tanks, a mixing device and a separate gas control device that itself distributes gas to each container unit. FIG. 7b shows a similar system with a control device that distributes gas to a manifold line from which gas is distributed to each container unit.

FIGS. 10A and 10C) and two plan views (i.e. FIGS. 10B and 10D) of one of the outlet valves;

DESCRIPTION OF THE PREFERRED EMBODIMENTS

Figure 1A:
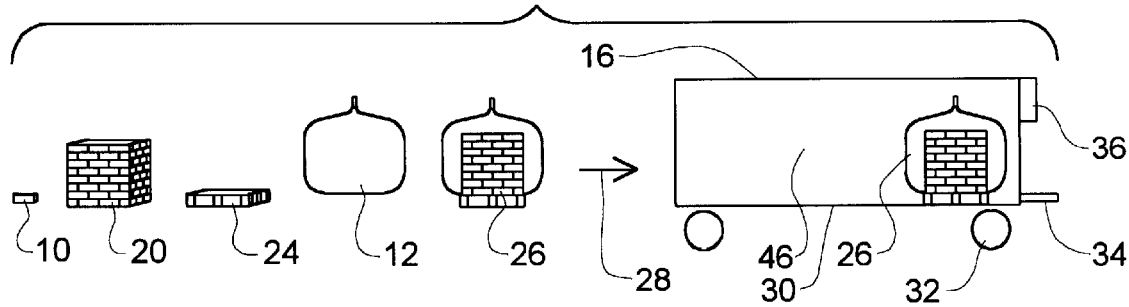
FIGS. 1A through 1F are somewhat schematic drawings showing the overall method of the present invention.

It is believed that a clearer understanding of the present invention will be obtained by first reviewing the overall system and method of the present invention, and also the main components incorporated therein. After that, there will be more detailed description of the components and various features of the present invention.

A. Introduction: Summary of the System of the Present Invention

Reference is made to FIGS. 1A through 1F which show the basic components and procedures in the present invention. The main components comprise the following:

i. The product 10 which is to be shipped and/or stored;

ii. The controlled atmosphere bags 12 in which the product 10 is shipped and/or stored;

iii. The gas supply and regulator apparatus 14 which supplies the appropriate gaseous mixture to the controlled atmospheric bags 12;

iv. The shipping containing structure 16 (generally either a large cargo container, a truck trailer, etc.) which carries the portions of the product 10 and their related bags 12 along with the gas supply and regulator apparatus 14 that maintains a controlled atmosphere in the bags;

v. A storage facility 18 to warehouse the product 10, still in its controlled atmosphere bags 12 (if needed);

vi. A plurality (20) or stack of product (10);

vii. An additional gas supply and regulator apparatus 22 for the storage facility (if needed).

With reference to FIG. 1A, let us assume that the product 10 is a perishable food product such as meat, fruit or vegetables, and this product 10 has been placed in boxes with each stack 20 of boxes being positioned on one of a number of pallets 24. Each stack of boxes 20 on each pallet 24 is enclosed in a related controlled atmosphere bag 12, and the upper open end of each bag 12 is closed in a manner that the interior of the bag 12 is sealed from ambient atmosphere.

The combination of each quantity of the product 10 alone or stacked (20) and positioned within a related bag 12, with the bag 12 sealed is, in the following description, to be considered an individual controlled atmosphere shipping unit 26 (which will hereinafter simply be called a "shipping unit").

As indicated by the arrow 28 in FIG. 1A, the shipping units 26 (either on the related pallets 24 or off the pallets 24) are moved into the shipping container 16, which in this instance is a semitrailer 30 of conventional design, having wheels 32 and a towing device 34 (a fifth wheel). Also, this trailer 30 is a refrigerated container, and there is shown a conventional refrigerating unit 36 mounted to the upper front end of the trailer. Alternatively, this shipping container 16 could be a seagoing cargo container, a railroad freight car, etc. Also, within the broader sense, this container 16 could comprise a support structure, such as a flat bed trailer or a flat bed railroad car. However, if such a flat bed trailer or the like is used, the shipping units 26 would desirably be enclosed within a protective tarp or the like. Usually, however, when proper temperature control is desired, the container 16 would be a closed insulated, and refrigerated container.

After the shipping units 26 have been loaded onto the semitrailer 30, then the gas supply 38 and regulator apparatus 40 is inserted on the trailer 30 as the last item to be loaded onto the trailer 30. However, alternative arrangements are possible. For example, the apparatus 14 could be propositioned in the trailer 30, and be located at the forward upper end of the trailer. This apparatus 14 is or may be, in some instances, a conventional design, or partly of conventional design along with certain specially designed components, as will be described later herein. The function of this gas supply and regulator apparatus 14 is (as the name implies) to supply a proper mixture of the controlled atmosphere gaseous components to insure that the proper atmosphere is provided to each of the shipping units 26 throughout the time that the product 10 is contained within its related bag 12.

Figure 1B:
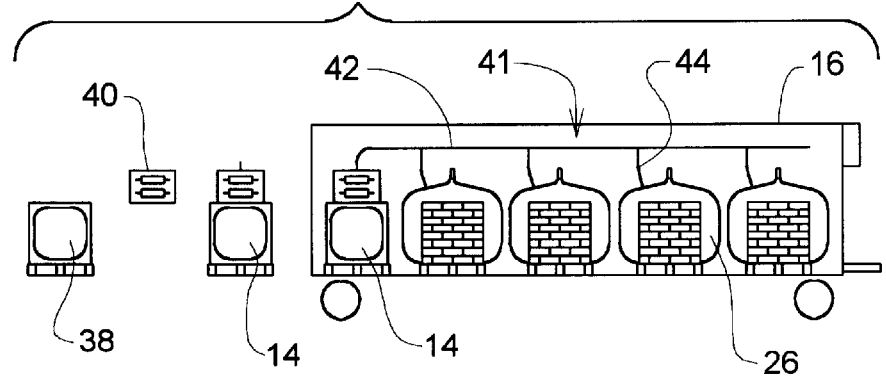

With reference to FIG. 1B, after the shipping units 26 and the gas supply and regulator apparatus 14 have been placed in the container 16, an operative connection is made from the gas supply and regulator apparatus 14 to the shipping units 26. (For convenience, in the remainder of this descriptive portion of this text, the "gas supply and regulator apparatus 14" will simply be referred to as the "gas supply apparatus 14" or the "gas supply unit 14").

The gas supply apparatus 14 comprises a gas supply section 38, which is shown as being positioned at the back end of the container 16 (i.e. the semi-trailer 30), and also a gas delivery or distribution apparatus and/or assembly 41. As will be described hereinafter, this gas delivery and distribution apparatus in FIGS. 1B, 1C and 1E comprises one or more manifold tubes 42 which is or are connected to a number of individual supply tubes 44 that connect between the manifold tube 42 and its related shipping unit 26. As will be described more fully hereinafter, the gas supply apparatus 14 periodically or continuously delivers a portion of the proper mixture of gases to the individual bags 12 of each shipping unit 26 to displace a portion of the gaseous atmosphere contained within the bags 12. The displaced gaseous atmosphere passes out through low pressure one-way relief valves formed in each bag 12. Thus, the proper atmosphere is maintained within each of the bags 12 of each shipping unit 26.

At the same time that the gas supply apparatus 14 (the gas source) is operating, the conventional refrigerating apparatus 36 of the semi-trailer would (assuming that the product 10 is one which should be refrigerated) operate to maintain the temperature in the interior of the trailer 30 at the proper temperature (this interior chamber or area of the trailer being designated 46). Normally, shortly after the connection has been made between the gas supply apparatus 14 and the shipping units 26, the gas supply apparatus 14 is put in its operating mode, delivering proper amounts of the replacement gaseous atmosphere at the appropriate pressure at properly timed intervals or in a steady flow.

Figure 1C:
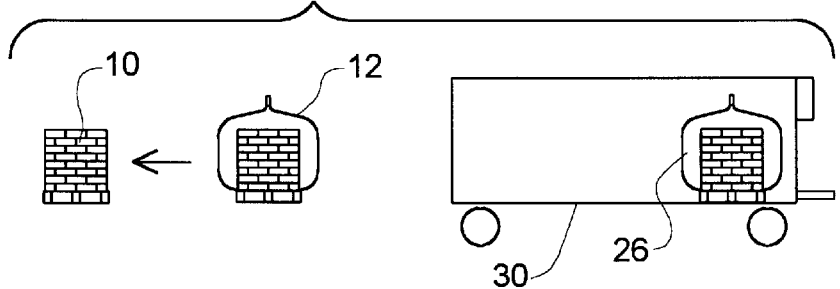

With reference to FIG. 1C, when the trailer 30 has reached its destination, the lines or tubes 44 are disconnected from the individual shipping units 26, and the shipping units 26 are removed from the trailer 30. If the location shown in FIG. 1C is the end destination for the shipment, the product 10 is removed from the bags 12 and then delivered or distributed locally in a time frame during which there would not be any significant deterioration of the product 10.

After the product is removed from the bags 12, the bags 12 can be folded into rather compact packages and then later used for containing another product on a back haul, or simply stored in the trailer 30 or other location to be brought back to the shipping location to be reused as indicated above. Another possibility is that the bags 12 can be disposable bags that are used for only one shipment.

As an alternative, however, it may be that after the initial loading, shipping, and unloading, accomplished as in FIGS. 1a–1c, the product 10 needs to be stored further or possibly reshipped to some other location. To describe how this is accomplished, reference is now made to FIGS. 1E and 1F.

Let us assume that the product 10 is not to be shipped immediately, but must be stored at some suitable facility for a period of time. In this instance, when the shipping units 26 are unloaded from the trailer 30, the product 10 would normally not be removed from the bags 12. Rather, the product 10 and its bag 12 is maintained as a sealed shipping unit 26 with the proper controlled atmosphere therein, and it is moved in a timely manner to a suitable storage facility, such as a warehouse, as indicated at 18 in FIG. 1D.

Figure 1D:
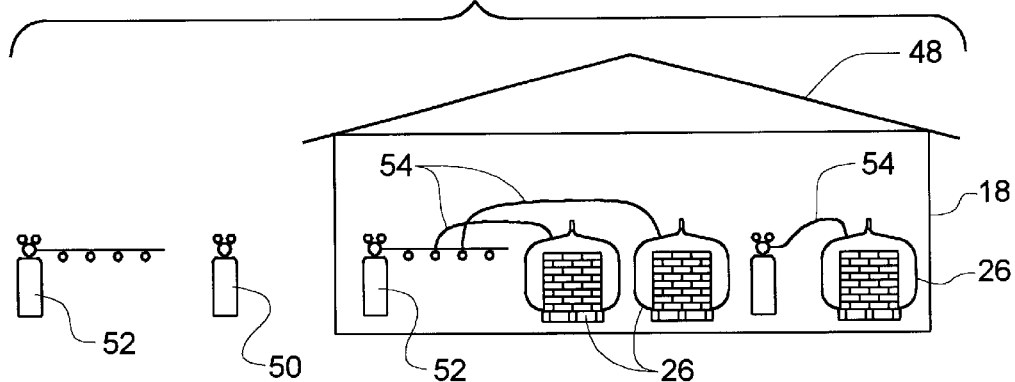

Assuming that the product 10 is one which should be refrigerated, the facility 18 would be, for example, a refrigerated warehouse, given the numerical designation 48. It is desirable to again connect each of the shipping units 26 to a suitable gas supply apparatus. In FIG. 1D there is shown a single shipping unit 26 connected to a single gas supply apparatus 50 which in this instance can be a single tank containing premixed gases and a regulator. A second gas supply unit is shown at 52, and this is connected through two lines 54 to two shipping units 26. It is apparent that in the location of the warehouse, these shipping units 26 now become storage units where each shipping unit is in a refrigerated location, with the controlled atmosphere apparatus 50 and 52 keeping the proper atmospheric balance within the bags 12 of the units 26.

Figure 1E:
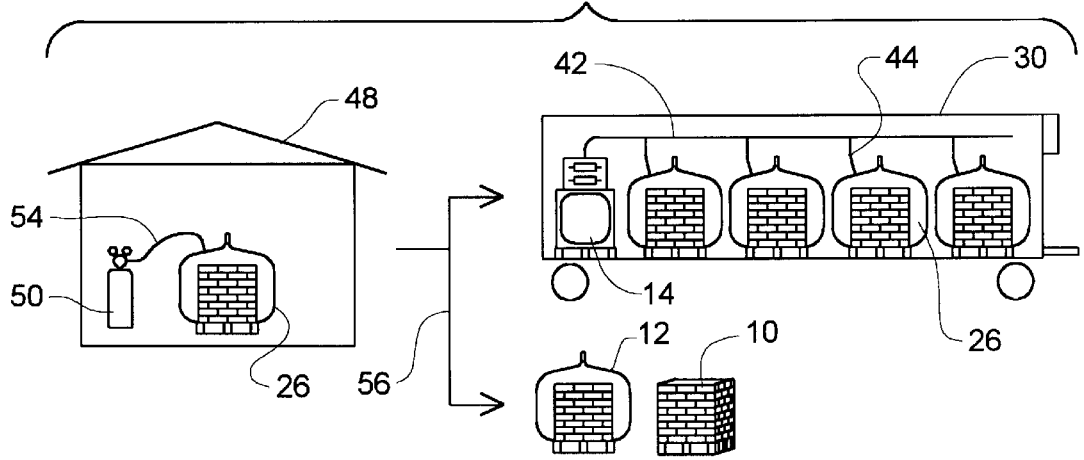
Figure 1F:
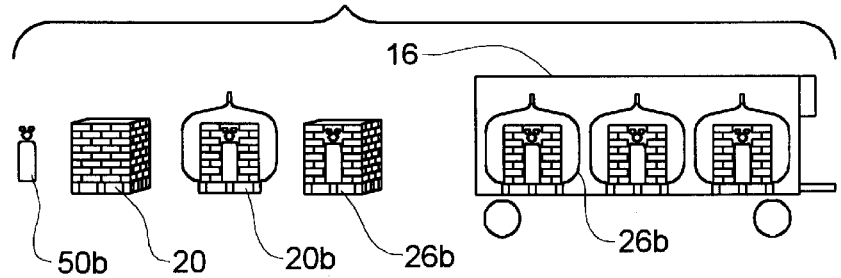

As an alternative, with reference to FIG. 1F, when the product 20 is initially placed on the pallet 24 and enclosed in the bag 12, the single gas supply apparatus 50b and the supply line could be made part of the unit 26b, with the supply apparatus 50b being inside or outside of the bag 12b. Thus, this combined unit 26b can be moved to or from a container to a warehouse, etc. without the need of providing another gas supply apparatus.

After a period of time, when it is desired to move the units 26 from the warehouse 48 as indicated by the arrow 56 in FIG. 1E, the shipping units 26 are removed from the warehouse 48. These are either delivered to another shipping container, to be handled in the same manner as described with reference to FIGS. 1A through 1C, or these are distributed locally by having the product 10 being taken out of the bags 12 and shipped to another location.

Let us now review various aspects of the overall system, method, and components described thus far with reference to FIGS. 1A through 1F. One feature of the present invention which becomes apparent is that the overall system is very compatible with, and readily adapted to, existing transportation systems. For example, the shipping container 16 could be a conventional semitrailer 30 with a conventional refrigerating unit 36. Alternatively, it could be a conventional freight car or a seagoing shipping container. The gas supply apparatus 14 could be installed as part of the container 16. However, it could also be provided as a stand alone item which could be placed in the container 16 only when needed, and promptly removed therefrom.

Further, conventional loading pallets 24 could be used to carry the product 10 and also the product/bag shipping units 26. Also, as it will be disclosed more fully hereinafter, the arrangement of the bags 12 is such that these can be used very conveniently in placing the product 10 inside of the bags 12. (This will be described later herein with reference to FIGS. 4A through 4E).

Conventional loading docks and storage facilities could also be used. For example, the refrigerated warehouse 48 shown in FIGS. 1D and 1E could be totally conventional. Further, as will be described more fully hereinafter, the gas supply units 50 and 52 that are shown as being in the warehouse 48 in FIG. 1D could be portable stand alone units, and could very easily be put into use for possibly only as few as one or two shipping units 26.

Also, even after the shipping units 26 have completed their "tour of duty" in one shipping sequence, and after the shipping units 26 are disconnected from the related gas supply apparatus 12, they can still be used at least for a limited period of time thereafter as protective containers to maintain the controlled atmosphere within a reasonable period of time (even though the controlled atmosphere is not being replenished by the gas supply apparatus 12), and also provide a certain amount of thermal insulation and protection.

With the foregoing description of the overall system and method being completed, there will now be a more detailed description of the individual components and other features of the present invention.

B. The controlled atmosphere bags 12

As a preliminary comment, the term "bag" has been used thus far in the description of the present invention as a convenient "shorthand" designation. Within the broader scope of the present invention, the term "bag" is to be given a somewhat broader meaning, commensurate with the scope of its functions in the present invention, and could include containers that normally would not be considered as "bags" in the traditional sense. In certain situations the "bag" may be a hard, non-flexible container.

Figure 2:
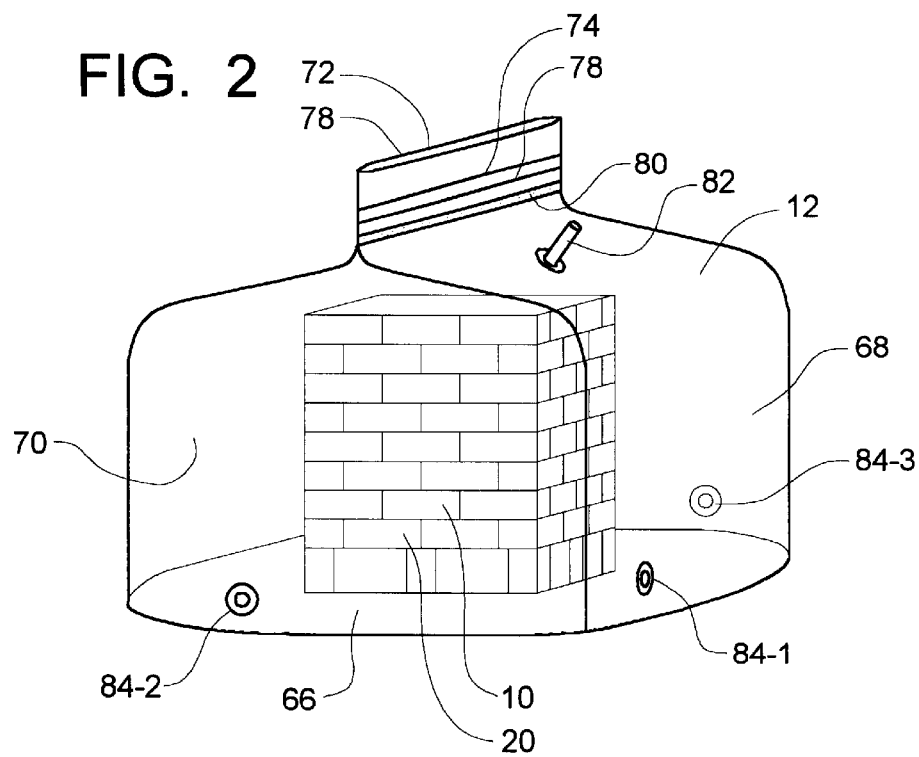
FIG. 2 is an isometric view illustrating one of the shipping units comprising the product enclosed in a related bag.
Figure 3:
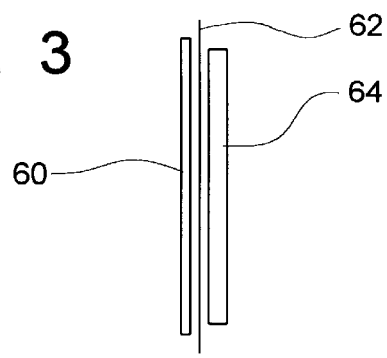
FIG. 3 is a cross-sectional view showing the layers or plies of the material that makes up the bag in FIG. 3.

In a preferred configuration, each bag 12 could be made as a three-ply poly-bag to provide proper strength, ruggedness, and barrier properties. The walls of the bag can have a combined thickness of the layers between about 6 and 12 mil. The number of layers, thickness, the hardness or flexibility, and the character of the material can be varied, depending on requirements, etc.. These layers can be joined in the conventional manner, such as by an adhesive. The inner-most layer shown in FIG. 3 as 60 can be made of polyethylene and it is a moderately durable and stretchable film that provides a base to use for holding the heat sealed valves. A metal foil 62 is used as the middle layer 62, such as aluminum. This film provides most of the oxygen-barrier qualifies for the bag. It insures that the desired mix of gases is not compromised by an inward seepage from outside air. The outside layer 64 is a hardy film such as polyester or nylon to give the bag protection against tears and punctures. An oxygen barrier heat seal joins the bag walls and lower floor or panel. As shown in FIG. 2, the bag panels are arranged so that in the operating position these would have the general configuration of a rectangular prism. More specifically, there is a bottom panel 66, front and rear panels 68, and side panels 70. The top 72 of the bag is completely open, to permit the product 10 to be moved into and out of the bag 12.

Within the broader scope of the present invention, the top part of the bag could be closed in various ways, or the closure could be at different locations. As shown herein, there are three closure segments (e.g. closure bands or lines). There is a first top seal 74 adhesive strip which is closer to the top edge 76 of the bag opening, a second adhesive strip 78 a short distance below the strip 74, and a lowermost velcro strip 80. The velcro strip comprises a female strip on one side and a male strip on the other. The purpose of the lower velcro strip is to allow easy closure and proper alignment of the upper portion of the bag to serve as a temporary or "short term" closure or to enable proper engagement of the adhesive seal strips 78 and 74.

The top adhesive strip 74 is a pair of elongate pieces of contact adhesive tape with a protective covering. When the bag is ready to be closed, the user simply peels off the protective sheeting and presses the two sides together to cause the opposite portions of the contact strip to bond together. The lower adhesive seal 78 also comprises a pair of contact adhesive tape portions with a protective covering. When the bag is initially loaded with product, only the top seal strip 74 is exposed and bonded to close the bag, while the protective layers remain on the lower strip 78. The reason for this is so that the end user (i.e. the person who receives the shipping unit 26 with the bag sealed) will be able to open the top end of the bag by cutting the adhesive strip 74 apart and remove some of the product. Then the bag 12 can be closed by taking off the protective strip from the second adhesive segment or strip 78 and sealing opposite sides of this tape segment to each other to again close the bag 12. On the other hand, if the receiver has the intention to open or close the bag numerous times then he will rely on the velcro closing to provide a seal that will be in most instances adequate. Other methods for closing and sealing may be used as well, such as heat sealing, or the tongue and groove system seen commonly in quick-lock sandwich bags.

The bag 12 is provided with an inlet valve 82 positioned on the front wall 68 a short distance below the velcro strip 80, so that the gaseous mixture from the gas supply apparatus 14 enters into the upper part of the bag 12. At lower locations on the bag 12, there is a plurality of outlet valves 84, three of which are shown at 84-2 and 84-3 on the two side walls 70 and one at 84-1 on the front wall 68. An additional outlet valve 84 is positioned on the rear panel 68, but cannot be seen in FIG. 3 because of the stack of packages 20 of product 10. The particular configuration of these valves 82 and 84 and also the manner in which these operate in conjunction with the gas supply apparatus 14 will be described in more detail later herein.

Figure 4A:
FIGS. 4A through 4E are simplified isometric views showing one method of placing the bag around a portion of the product which is placed on a pallet.
Figure 4B:
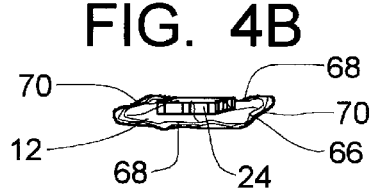

The manner in which a portion of the product 10 can be loaded in the bag will now be described with reference to FIGS. 4A through FIG. 4E. With reference to FIG. 4A, there is shown a single pallet 24. In FIG. 4B, there is shown the same pallet 24 with the collapsed bag 12 being placed over the pallet. The lower bag panel 66 lies directly on the pallet 24, and the four surrounding walls 68 and 70 are collapsed around the side of the pallet. It is to be understood that the term "pallet" is to be used in a broader sense to include support structure for a product, cargo or load, which facilitates handling, movement, or other operations.

Figure 4C:
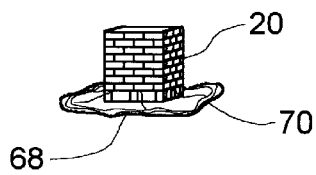
Figure 4D:
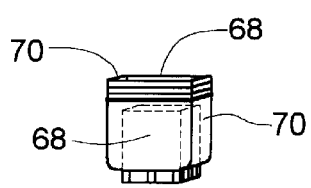
Figure 4E:
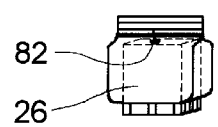

Then, as shown in FIG. 4C, a plurality of packages 20 containing the product 10 are stacked on the bag panel 66 on the pallet. After this (see FIG. 4D) the front, rear and side panels 68 and 70 are raised to the position of 4D. Then (see FIG. 4E) the top portion of the bag 12 is closed in the matter described previously herein with reference to FIGS. 2 and 3.

It can readily be appreciated that the product can be quite easily unloaded simply by opening the top of the bag, dropping the flexible side walls of the bag 12 downwardly so that these are back in the position of 4C, after which the stack of product 20 is unloaded from the pallet 24.

It is to be understood that while the bag 12 has been described as being made of a totally flexible material, different arrangements are possible. For example, the bottom panel 66 could be made stiff or only moderately flexible. Also, one or more of the side walls could be made rigid or semi-rigid, and these could be connected together by a flexible material so that these could be folded down one over the other to make a compact package so that these could be easily sent back to the shipping destination.

C. The gas supply and regulating apparatus 14.

Reference is now made to FIGS. 5 through 8 which show three possible configurations. As indicated previously, this gas supply apparatus 14 could be made in a simplified version, as a premixed gas container as indicated at 85 in FIG. 5. This premix gas container 85 comprises a containing section 86, and valve section 88. The valve section 88 comprises a valve which can be moved between the on/off positions, and in addition (if desired) to be moved to various intermediate positions. Also, this valve section 88 could be provided with a pressure regulating device so that the pressure in the tank would be stepped down to a suitable constant level for the proper level of gas pressure and rate of volumetric flow.

Figure 5:
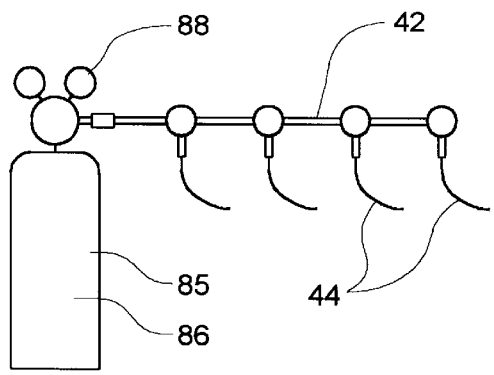
FIG. 5 is an isometric view of a prepackaged gas supply of the present invention servicing a plurality of the container units.

As shown in FIG. 5, there is a single manifold tube 42, and a plurality of branch tubes or lines 44 extending therefrom to be connected each to a related shipping unit 26. Also, this valve section 88 would be supplied with a suitable timing mechanism to open the valve periodically for predetermined lengths of time, or a constant set flow. If a timer is used, the timer could be set to optimize the time period of the flow of the replacement gas mixture to match the requirements of the individual shipping container unit or units 26.

Figure 6:
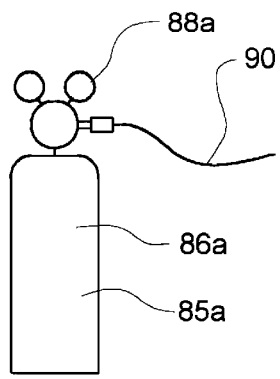
FIG. 6 is an isometric view similar to FIG. 5, showing the gas supply apparatus servicing only one container unit.

Another arrangement is shown in FIG. 6, where there is a premix gas tank 85a, and comprising a containing section 86a and a valve section 88a. There is only a single line 90 extending from the valve section 88a.

Figure 7A:
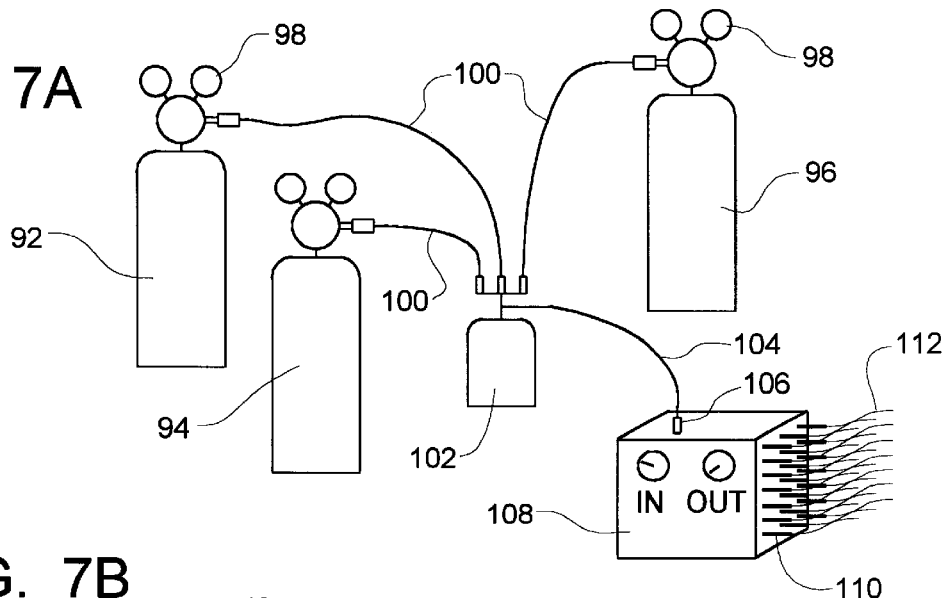
FIG. 7a and 7b are isometric views showing gas supply and control systems.

FIG. 7 shows an arrangement where there is a plurality of gas tanks, each having a different gas component and all these leading to a single mixing tank, which in turn leads to a pod pressure regulator. More specifically, there are three tanks, 92, 94 and 96, each having a valve section 98 connecting to a respective line 100, leading to the mixing tank 102. The mixing tank 102 has a single line 104 leading into an inlet connecting stub 106 of a distribution unit 108.

Figure 7B:
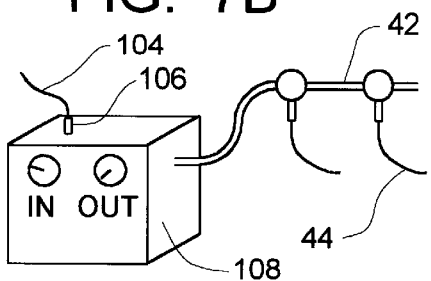

The distribution unit 108 in turn comprises a plurality of outlet pegs 110, each of which connects to a related one of a plurality of tubes 112, with each tube 112 leading to a related shipping unit 26. In the arrangement of FIG. 7, there could be a central timing unit which operates each of the valve sections 98, and each valve section 98 could be a set to deliver a predetermined amount of its gas during each time interval. Alternatively, there could be only one inlet and one outlet manifold hose (42) as shown in FIG. 7b with tubes 44 leading from the manifold line to the shipping units 26.

It is evident that other control functions could be added. For example, the distribution unit 108 could be arranged so that each of the individual outlet pegs has a timing device or other control device (e.g. a valve) to limit the amount of gaseous flow during each of the time intervals during which the flow is to occur. These adjustments in the time intervals could be utilized, for example, where the quantity and/or requirements of the particular product in each of the shipping units had different requirements for the quantity of replacement gas.

Figure 8:
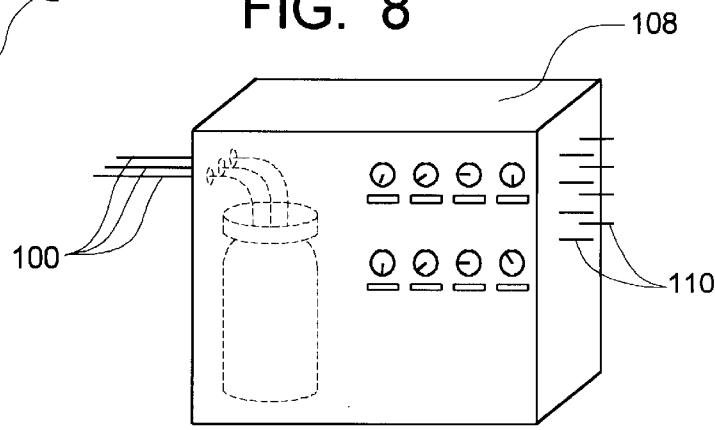
FIG. 8 is an isometric view of another form of the gas supply and control unit.

FIG. 8 shows a somewhat modified arrangement, where there is a distribution unit 108 with the outlet pegs 110. However, the lines 100 from the tanks 92, 94 and 96 all lead to the distribution unit 108, and the mixing of the gaseous components takes place in a tank which is part of the distribution unit 108.

D. The valve system for the bags 12.

Figure 9:
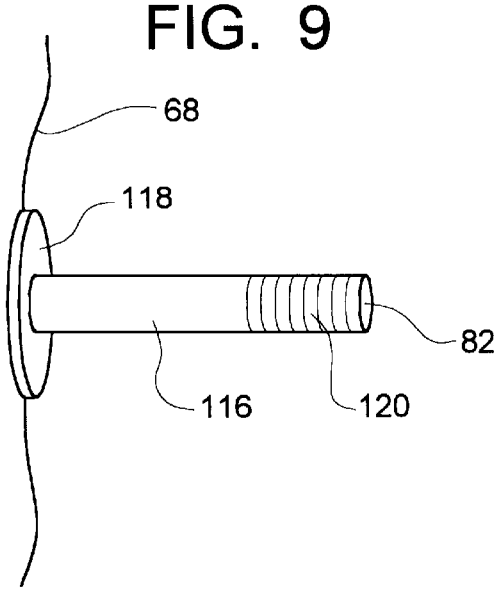
FIG. 9 is an isometric view of an inlet check valve used in the controlled atmosphere containing bags.
Figure 10A:
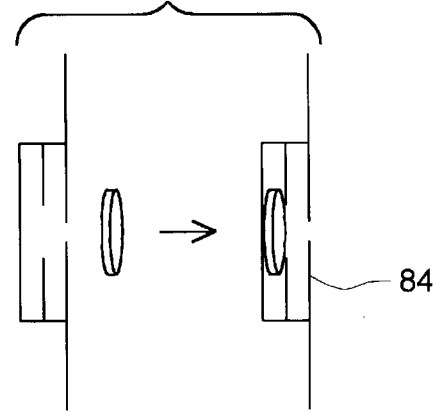
FIGS. 10A, 10B, and 10C and 10D are two side views (i.e.
Figure 10B:
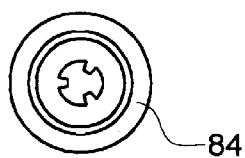
Figure 10C:
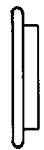
Figure 10D:
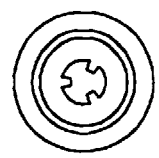

FIG. 9 shows the inlet valve 82. This valve 82 is or may be of conventional design and comprises a polyethylene tube 116 mounted to a base 118 that is heat sealed or pressure sealed to the front wall 68 of the bag 12. The tube has a threaded outer end 120 to better enable it to grip the rubber hose to which is attached, and also to secure a suitable cap when the hoses are disconnected. As indicated above, this valve 82 is or may be of conventional design. The valve could have a stop cock to open or close the valve, or it could in some applications be a check valve so that it would permit the inflow of the gaseous mixture and no reverse flow.

FIGS. 10A, 10B, 10C and 10D show four views of components of one of the four identical outlet valves 84. Since the valve 84 itself is, or may be of conventional design, it will not be described in detail and numerical designations will not be given to the valve components. As indicated previously, three of the valves 84 are shown in FIG. 2, while the fourth valve 84, in the showing of FIG. 2, is hidden behind the stack of packaged product 20, and positioned on its side panel 70 at a location similar to the other three valves 84. Each of these valves is made of polyethylene and the diaphragm 126 is made of urethane and held in place by a silicone-based oil. Obviously the number and placement of the valves could vary from one valve to many valves at various locations to meet various requirements of circulation patterns operational or manufacturing considerations, etc. Additionally, the type of materials and style used in valve manufacture may vary with bags and operational considerations.

Pressure sequencing is important to obtain the proper gas flow in the bag 12. The valves 84 in this embodiment are arranged as follows. There is a back valve 84 which is not visible in FIG. 2, and this is positioned (as seen in FIG. 2) in the back wall 68 which is furthest from the viewer who is positioned looking toward the bag 12 as it is seen in FIG. 2. The valve 84 (not seen in FIG. 2) which is furthest from the inlet valve 82 is arranged so that it requires the least pressure to open. This helps direct the flow of the fresh gas mixture flowing in the inlet valve 82 and in all directions across the product from the valve 82. For example, this valve 84 might require only three inches of water column pressure to open and two inches of water column pressure or less to close. The two side valves 84-2 and 84-3 which are positioned downwardly and off to the side from the inlet valve 82 require a higher pressure to open, such as four inches of water column and a pressure of three inches of water column to close. The front valve 84-1 is open when the pressure is too high to maintain the exhaust flow by the other three valves 84. Generally, the front valve will not open unless the other valves 84 fail or clog, or if other shipping units 26 are pushed against the valve so that the valve 84 is not allowed to function. The valve 84-1 opens at a higher pressure such as five inches of water column and closes under four inches of water column pressure. In a proper functioning shipping unit 26, the gas flow will be constant through the back valve 84 and periodic through the two side valves 84-2 and 84-3.

This outlet valve 84 is or may be of conventional design, and the components of one such valve are shown in FIGS. 10A–10D. The valve has a flexible plastic insert such as a urethane, that is pressure sealed by the nubs or retaining pins of the polyethylene housing. A silicon sealant in liquid form exists in the boundary of the back wall of the housing and the insert creating a gas or oxygen barrier. At a certain pressure difference (exerted within the bag) between the back wall and the front wall of the valve, the insert will "float or bend" off of the retaining wall allowing gas to flow. Once the pressure has equalized between the front and back walls of the valve, the insert will float back to flush to the retaining wall. A more exacting description is contained in U.S. Pat. No. 5,584,409 "one direction ventilation valves" by Christopher H. Chemberien - Column 2 Paragraph 28:

"The valve, positioned externally on the wall of the container operates by allowing a higher pressure gas, for example, air, to flow through the opening in the container wall and simultaneously through the hole or holes in the raised section of the valve seat when positive pressure is exerted on the interior of the container relative to the pressure on the exterior of the container. The high pressure gas elongates or moves the elastic valve element away from the raised section of the valve seat. This in turn allows high pressure gas to pass through the fluid passageway or passageways, for example, then through a hole or holes in the valve element to the environment outside the container. Then the internal and external pressures have reached equilibrium, the elastic valve element returns to its original shape, and closes or seals around the hole or holes in the raised section of the valve seat, thereby preventing gas from flowing from outside the container to inside the container."

E. Alternative Shipping Containers and Other Features.

Figure 11:
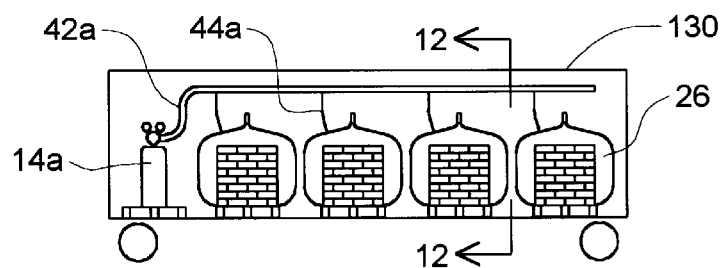
FIG. 11 is a simplified drawing showing a plurality of the container units positioned in a large shipping container.
Figure 12:
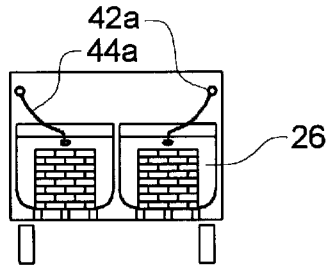
FIG. 12 is a sectional view taking along line 12—12 of FIG. 11, and showing the two rows of containing units serviced by the gas supply system.

By way of example, a trailer 30 was shown in FIGS. 1A through 1C. In FIGS. 11 and 12, there is shown a box-like shipping container 130 which has a rectangular configuration. Such containers are commonly used for placing shipments of products into ocean going vessels and also on railroad cars. The container 130 is or may be of conventional design. As shown herein, the container is provided with a gas supply and regulating apparatus 14a which can be the same as or similar to the gas supply and regulating apparatus 14 shown in FIGS. 1A through 1C. More particularly, there is shown the manifold tubes 42a and the individual lines 44a. It can be seen in FIG. 12 that there are two manifold tubes 42a extending along opposite upper side edges of the container 130, and the shipping units 26 are placed in two rows extending the length of the container 130. As an alternative there may be one manifold tube 42a along the side of the container 130 with individual feed lines 44a leading to both rows of shipping units 26.

Figure 13A:
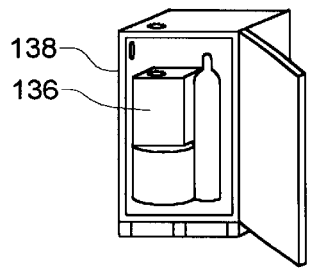
FIGS. 13A and 13B are isometric drawings of the gas regulating portion of the gas supply section enclosed in a cabinet.
Figure 13B:
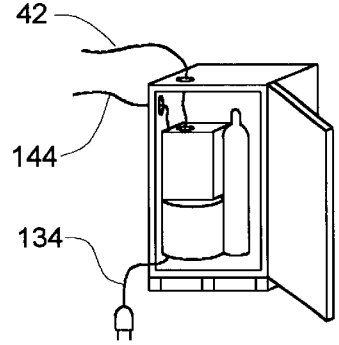

FIGS. 13A and 13B show a design of a regulator unit 136 of a gas supply section indicated where the components are conveniently located in a cabinet 138 which can function as a separate unit that can be moved into and out of a shipping container, such as an over the road trailer. The same cabinet 138 is shown in FIG. 13B with a power line (134) (where in this instance it is an electrically powered unit) and also gas supply lines (144) from an auxiliary gas supply.

Figure 14:
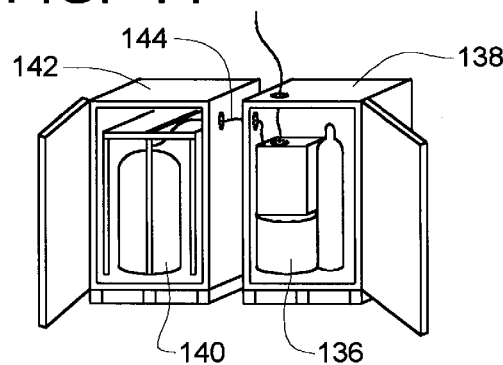
FIG. 14 is an isometric similar to FIGS. 13A and 13B showing the gas supply tanks in a cabinet.

FIG. 14 shows a gas supply unit 140 comprising a cabinet 142 in which is housed the gas cylinders that direct the gas to the unit 138 through gas line 144.

Figure 15:
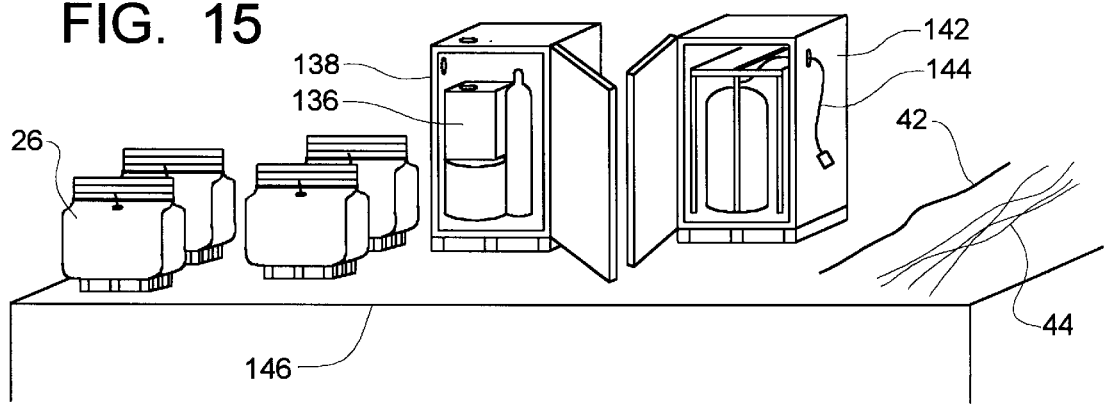
FIG. 15 is an isometric view of a loading dock containing shipping units, the gas regulator assembly, a gas supply unit, a manifold tube and gas tubes that feed the shipping units.

Reference is now made to FIG. 15 which illustrates the present invention as it might appear in a common commercial environment, such as preparation for loading into a shipping container from a shipping or loading dock. In FIG. 15 there is a plurality of the shipping units 26 positioned on a loading dock 146, and also a connecting line 42 and some connection hoses 44, and the gas regulator unit 136 in a cabinet 138 and a gas supply unit 140 in a cabinet 142 with a gas supply line 144.

Figure 16:
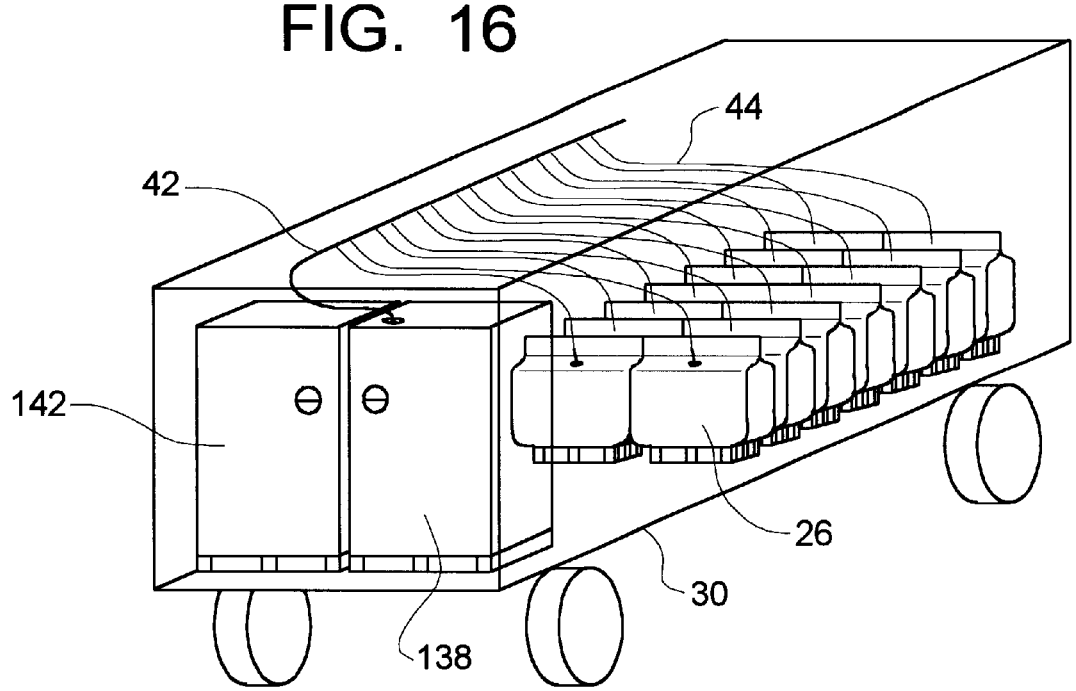
FIG. 16 is an isometric view similar to FIG. to 15 showing the shipping units, the gas regulator unit and the gas supply unit loaded in the semi-trailer.

FIG. 16 shows a closed shipping container 30 with a transparent view into the container showing the positions of the gas regulator assembly cabinet 138, the auxiliary gas supply cabinet 142, the gas manifold tube 42 leading from the gas regulator cabinet 138, the connecting hoses 44 feeding gas from the manifold line 42 directly to the shipping units 26, and a plurality of shipping units 26. The gas regulator assembly cabinet 138 and the gas supply cabinet 142 are the last items to be loaded into the trailer 30. They are set up and made operational prior to closing the doors on the shipping container 30.

F. Operation of the present invention.

Since many of the details of the operation of the present invention have been described previously herein, in this section there will be given only an overall summary of the operation, making reference not only to FIGS. 1A through 1F, but also to the other Figures in the drawings.

Initially, quantities of the product 10 are placed in individual bags 12 which are then sealed to close the upper bag opening. These form a plurality of the shipping units 26, each made up of a related bag 12 with the quantity 20 of the product 10 contained therein. The product 10 is, as indicated previously, one which can benefit from having a controlled atmosphere surrounding the product and in some instances possibly permeating the product. Such products can typically be food products of various sorts.

Each of the shipping units 26 is then placed in a container 16, such as the semi-trailer 30 shown in FIGS. 1A–1C or the box-like shipping container 130 shown in FIGS. 11 and 12, etc. The container 16 is provided with the gas supply and regulating apparatus 14 (called the gas supply apparatus 14), and the distribution section 108 of the gas supply section 14 is connected to the shipping units 26 contained in the shipping container 16. This can be done by connecting individual tubes 112 from the supply and regulating apparatus 108 as shown in FIG. 7, or by means of a manifold tube or tubes such as shown at 42 and individual distribution tubes 44 in FIG. 7b (and also in FIGS. 1B, 1D, etc.).

The pressure and regulating system 14 remains in its operating mode throughout the entire period that it is connected to the shipping units 26. The mode of operation is such that a desired mixture of the gases is periodically or continuously directed through the distribution lines to the individual shipping units 26. The pressure at which the gaseous mixture is delivered is high enough so that when it enters through the intake valve 82 and passes into the interior of each of the bags 12, it passes downwardly around the contained product 22 and outwardly through the outlet valves 84. The pressure at which the outlet valves 84 open is controlled so that the furthest valve 84 opens at a lower pressure, the side valves 84-2 and 84-3 (next nearest) open at a somewhat higher pressure, while the nearest valve opens only when one or more of the other valves fail to open for some reason. The flow of the fresh gaseous mixture into the interior of the bag 12 replaces all or a portion of the gaseous mixture already in the container.

As described previously, where the product is a food product, the chemical reactions and bacterial action will cause the gaseous mixture in the bag to become stale so that it loses its ability to prolong the useful life of the product so that the product deteriorates. However, the periodic replacement of the gaseous mixture in the bag 12 with the fresh gas provides the desired balance of gases in the gaseous mixture to enhance the useful life of the product.

It should be emphasized that the container 16 can be a conventional container. In the event that the container is refrigerated (which often is the case with perishable food products), the refrigeration cycle can proceed in the usual manner. During the periods of defrost, the fact that the product is contained in the bags 12 helps to have an insulating effect to at least partially isolate the product from the variations in the temperature inside the container. Also, in contrast to the requirements in the prior art where the controlled atmosphere would be accomplished by replacing the entire gaseous atmosphere within the open container, in the present invention, it is necessary only to replace the gaseous mixture which is within the bags 12 and thus immediately adjacent to the product. This substantially increases the efficiency of the gas dispensing system so that it can operate more efficiently.

The product in the shipping units can be identified as those requiring no further controlled atmosphere environment or requiring the controlled atmosphere environment, and then handled accordingly. For those shipping units 26 in the first category, when the container with its cargo of shipping units 26 reaches the end destination, the shipping units 26 are then disconnected from the gas supply apparatus 14 and unloaded from the shipping container 16. At this point, the product that has been shipped can be removed from the bags 12 and promptly moved to the next destination.

For the shipping units 26 in the second category, if the product is to be reshipped over a distance or stored for a period of time, the product will remain in the bags 12 to keep the shipping units 26 intact, and these shipping units 26 are then reconnected to another gas supply apparatus. In the event that there is only a small quantity of shipping units, then it may be desirable to use a more simplified gas supply unit, where there is a single container of a gas mixture that has been premixed. Then if the shipping units each have its related gas supply apparatus as part of the unit 26, then these can be delivered to second transportation container, stored, etc., while remaining operatively attached to its gas supply unit.

It is to be understood, of course, that various modifications could be made to the present invention without departing from the basic teachings thereof. For example, the basic function of the bag 12 is to provide a means of containing quantities of the product and substantially isolating it from the surrounding atmosphere, while providing enough space around the product for a sufficient volume of the controlled mixture of gas components. Thus, the bag could be arranged in different configurations, could be made partly flexible, and partly rigid, etc. Also, there can be different ways of closing and opening the bag, differing arrangements of the gas inlet and outlet system in the bag, etc. Also, while the preferred form for providing for the circulation of the fresh gas mixture is to have pressure sensitive inlet and outlet valves, within the broader scope of the invention, other valves could be provided which would be responsive to some other means of opening and closing these valves, such as being computer operated, or in accordance with an automatic timing sequence. Further, while the circulating pattern is accomplished by properly placing the valves, other methods could be used to cause a proper circulation of the gaseous mixture and displacement of the stale gaseous mixture.

Also, the loading and unloading of the shipping units 26 could vary. Further, in some instances it may be desirable to add another containing or positioning structure to one or more of the shipping units 26, depending upon other requirements.

In general, where such modifications or alternative arrangements could be made or added, so that such various alternatives or added features, components and combinations, provide or incorporate certain advantages and/or operating features of the present invention, even though these are achieved by means other than those specifically shown herein, these are to be included as part of the present invention.

Therefore, I claim:

1. A method of transporting a perishable product by means of a transport container having a containing region in a manner to provide a controlled atmosphere environment for the product, said method comprising:

a) placing a quantity of said product in a controlled atmosphere container to provide a controlled atmosphere shipping unit comprising said controlled atmosphere container with said quantity of product therein;

b) providing a gas source of controlled atmosphere gas;

c) locating said shipping unit in the containing region of the transport container and directing controlled atmosphere gas into said controlled atmosphere container to provide a desired controlled atmosphere environment for the quantity of product;

d) transporting said transport container to a destination location, with said shipping unit therein, while maintaining the desired controlled atmosphere environment in the shipping unit.

2. The method as recited in claim 1, wherein there is a plurality of quantities of product, and each of said quantities is placed in a related controlled atmosphere container to form a plurality of controlled atmosphere shipping units, which are located in the containing region, and having controlled atmosphere gas directed into the controlled atmosphere shipping units, with said plurality of shipping units being transported in the transport container to the destination.

3. The method as recited in claim 2, further comprising connecting said gas source through gas passageways to two or more of said controlled atmosphere shipping units.

4. The method as recited in claim 2, further comprising regulating flow of controlled atmosphere gas from said gas source to said units to maintain the desired controlled atmosphere environment in the units.

5. The method as recited in claim 4, further comprising providing at least one pressure responsive outlet for each of said controlled atmosphere containers to discharge gas from the controlled atmosphere shipping units.

6. The method as recited in claim 5, comprising monitoring gaseous exhaust from one or more of said controlled atmosphere shipping units, and regulating gas directed into said one or more of said controlled atmosphere shipping units accordingly.

7. The method as recited in claim 6, wherein said regulating of said gas is accomplished at least in part by controlling quantities of gas components making up the controlled atmosphere gas directed into the shipping unit to obtain a proper balance of gas components for the controlled atmosphere environment.

8. The method as recited in claim 1, wherein said controlled atmosphere container has a base and a collapsible side wall portion, said method comprising placing said base on a pallet with said side wall portion being in a collapsed position, placing said quantity of product on the base, raising the side wall portion of the controlled atmosphere container and closing an upper part of said side wall portion to close a controlled atmosphere chamber of said controlled atmosphere shipping unit.

9. The method as recited in claim 1, wherein, after arrival of the transport container at said destination location, said method comprising removing said controlled atmosphere shipping unit from said containing region and locating the shipping unit at one or more subsequent locations while maintaining a controlled air environment in the shipping unit.

10. The method as recited in claim 9, wherein said method comprises further providing a source of controlled atmosphere gas at said subsequent location or locations and directing additional controlled atmosphere gas to said shipping unit as needed to maintain a desired controlled atmosphere environment in said shipping unit.

11. The method as recited in claim 1, wherein the controlled atmosphere gas is directed through a controlled atmosphere gas inlet in said controlled atmosphere shipping unit during one or more time periods and discharging gas from the controlled atmosphere shipping unit through one or more outlet openings during one or more time periods to maintain a desired controlled atmosphere environment in the shipping unit.

12. The method as recited in claim 1, said method further comprising transporting said controlled atmosphere shipping unit in the container region of at least one of the following: a truck, a trailer, a semitrailer, a boat, a barge, a railroad car, an aircraft, a flatbed shipping structure, or a shipping container structure which is adapted for transport of cargo by any one of the above.

13. The method as recited in claim 1, comprising utilizing as said gas source a gas container and a gas regulation unit to regulate flow of gas from the gas container to the shipping unit.

14. The method as recite din claim 13, where there are two or more gas containers, each containing a gas component of a gaseous mixture which makes up the controlled atmosphere gas, and said gas regulating unit controls flow of said two or more gas components.

15. The method as recited in claim 14, wherein there are two or more shipping units, and controlled atmosphere gas from said gas regulating unit is directed to said two or more shipping units.

16. The method as recited in claim 2, wherein said plurality of shipping units are placed in the containing region of the transportation container, and said gas source, comprising a gas container and gas regulating unit is placed in said containing region and operatively connected with said shipping units, said gas source being arranged to be removable from said containing region after use.

17. The method as recited in claim 1, wherein a plurality of shipping units are located in the containing region and the gas source comprising a gas container and a gas regulating unit is formed as a component of said transport container and is connected to said shipping units when they are located in the containing region, and disconnected from the shipping units when the shipping units are removed from the containing region.

18. The method as recited in claim 1, wherein said controlled atmosphere container is a flexible inflatable member, and said controlled atmosphere gas is directed into said controlled atmosphere container to inflate said controlled atmosphere container in a manner that the controlled atmosphere gas is adjacent to substantial outer surface portions of said quantity of product.

19. The method as recited as claim 18, wherein gas in said controlled atmosphere container is removed during one or more time periods through a pressure responsive discharge valve which permits discharge at a pressure higher than ambient pressure around said controlled atmosphere container, and controlled atmosphere gas is directed into said controlled atmosphere container to pressurize said controlled atmosphere container to a pressure above said ambient atmospheric pressure around said controlled atmosphere container.

20. The method as recited in claim 19, wherein there is a second pressure responsive discharge valve to permit discharge of gas therethrough at a pressure higher than the discharge pressure of the discharge valve of claim 19.

21. A method of positioning and arranging a product in a manner to provide a controlled atmosphere environment for the product, said method comprising:
  a) placing a quantity of said product in a controlled atmosphere container to provide a controlled atmosphere shipping unit comprising said controlled atmosphere container with said quantity of product therein;
  b) locating said shipping unit in a containing region of a transport container;
  c) positioning a gas source of controlled atmosphere gas in, or in proximity with, said transport container, so that said gas source is operatively connected to or positioned and arranged to be operatively connected to, said shipping unit, so that controlled atmosphere gas is directed into, or is able to be directed into said controlled atmosphere container to provide a desired controlled atmosphere environment for the quantity of product;

whereby said transport container is able to travel to a destination location, with said shipping unit therein, while maintaining the desired controlled atmosphere environment in the containing unit by directing said controlled atmosphere gas from said gas source into the shipping unit.

22. The method as recited in claim 21, wherein there is a plurality of quantities of product, and each of said quantities is placed in a related controlled atmosphere container to form a plurality of controlled atmosphere shipping units, which are located in the containing region and arranged to be operatively connected with, or operatively connected with, said gas source.

23. The method as recited in claim 22, further comprising connecting said gas source through gas passageways to two or more controlled atmosphere shipping units.

24. The method as recited in claim 22, further comprising providing at least one pressure responsive outlet for each of said controlled atmosphere containers for discharge of gas from the shipping units.

25. The method as recited in claim 24, comprising providing a gas monitoring section to monitor exhaust gas from one or more of said controlled atmosphere shipping units and providing a gas regulating portion to regulate gas directed into said one or more of said controlled atmosphere shipping units accordingly.

26. The method as recited in claim 21, wherein said transport container comprises or is part of, at least one of the following: a truck a trailer, a boat, a barge, a railroad car, an aircraft, a flatbed shipping structure, or a shipping container structure which is adapted for transport of cargo by any one of the above.

27. A method for receiving and disposition of a perishable product that is in a transport container having a containing region, where the product comprises a quantity of said product which is positioned in a controlled atmosphere container in the form of a controlled atmosphere shipping unit comprising said controlled atmosphere container with said quantity of product therein, located in said containing region, and there is (or has been) a gas source of controlled atmosphere gas in, or in proximity, the containing region of the transport container to direct controlled atmosphere gas into said controlled atmosphere container to provide a desired controlled atmosphere environment for the quantity of product, said method comprising:
 a) ascertaining an expected future handling of the quantity of the product and a time frame within which the handling is to take place, to classify the quantity of product as:
  i. a first category of a quantity of product not reasonable requiring a controlled atmosphere environment;
  ii. a second category of a quantity of product requiring continued presence of a controlled atmosphere environment;
 b) for a quantity of product in the first category, removing the quantity of product from the controlled atmosphere container;
 c) for a quantity of product in the second category maintaining the quantity of product in a controlled atmosphere container.

28. The method as recited in claim 1, wherein there is a plurality of said controlled atmosphere shipping units, which are located in the containing region, and having controlled atmosphere gas directed (or having been directed) into the controlled atmosphere shipping units, with said plurality of shipping units being identified as either requiring or not requiring further a controlled atmosphere environment, and after arrival of the transport container at said destination location, for the shipping units requiring a controlled atmosphere environment, maintaining a controlled atmosphere environment for such shipping units.

29. The method as recited in claim 28, further comprising further providing a source of controlled atmosphere gas at said subsequent location or locations and directing additional controlled atmosphere gas to said shipping unit as needed to maintain a desired controlled atmosphere environment in said shipping unit or units.

30. A shipping assembly for transporting a perishable product in a manner to provide a controlled atmosphere environment for the product, said assembly comprising:
 a) a transport container having a containing region;
 b) a controlled atmosphere container and a quantity of said product positioned in said controlled atmosphere container to provide a controlled atmosphere shipping unit comprising said controlled atmosphere container with said quantity of product which is located in said containing region;
 c) a gas source of controlled atmosphere gas, which is in, or in proximity with, said containing region to direct controlled atmosphere gas into said controlled atmosphere container to provide a desired controlled atmosphere environment for the quantity of product
whereby said shipping assembly is arranged to travel from a first location to a destination location, with said shipping unit therein, or to have traveled to a destination location, while maintaining the desired controlled atmosphere environment in the shipping unit.

31. The assembly as recited in claim 30, wherein there is a plurality of controlled atmosphere shipping units, which are located in the containing region, having controlled atmosphere gas in the controlled atmosphere shipping units.

32. The assembly as recited in claim 31, wherein there is at least one pressure responsive outlet for each of said controlled atmosphere containers to discharge gas from the shipping units.

33. The assembly as recited in claim 30, wherein said gas source has a gas regulation section to control quantities of gas components making up the controlled atmosphere gas directed into the shipping unit to obtain a proper balance of gas components for the controlled atmosphere environment.

34. The assembly as recited in claim 30, wherein said transport container is part of, or comprises at least one of the following: a truck, a trailer, a semitrailer, a boat, a barge, a railroad car, an aircraft, a flatbed shipping structure, or a shipping container structure which is adapted for transport of cargo by any one of the above.

35. The assembly as recited in claim 30, wherein said gas source comprises a gas container and a gas regulation unit to regulate flow of gas from the gas container to the shipping unit, and there are two or more gas containers, each containing a gas component of a gaseous mixture which makes up the controlled atmosphere gas, and said gas regulating unit controls flow of said two or more gas components.

36. The assembly as recited in claim 31, wherein said plurality of shipping units are positioned in the containing region of the transport container, and said gas source, comprising a gas container and a regulating unit is placed in said shipping region and operatively connected with said shipping units, said gas source being arranged to be removable from said containing region after use.

37. The assembly as recited in claim 30, wherein a plurality of shipping units is located in the containing region and the gas source comprising a gas container and a gas regulating unit formed as a component of said transport container and is connected to said shipping units when they are located in the containing region, and disconnected from the shipping units when the shipping units are removed from the containing region.

38. The assembly as recited in claim 30, wherein said controlled atmosphere container is a flexible inflatable member, and said controlled atmosphere gas is directed into said controlled atmosphere container to inflate said controlled atmosphere container in a manner that the controlled atmosphere gas is adjacent to substantial outer surface portions of said quantity of product.

39. A portable controlled atmosphere shipping container to contain a quantity of a perishable product so as to form a shipping unit with a controlled environment containing chamber, which shipping unit can be transported in a containing region of a transport container in a manner to provide a controlled atmosphere environment for the quantity of the product, said portable shipping container comprising:

a) a containing section comprising a base and a surrounding side wall having an upper side wall portion with an upper perimeter edge portion defining an access opening, said containing section defining a controlled atmosphere containing chamber to contain the quantity of perishable product;

b) said containing section having a controlled atmosphere gas inlet to receive controlled atmosphere gas directed into said chamber;

c) said containing section having a controlled atmosphere gas outlet through which gas in the containing chamber is able to be discharged from said containing chamber;

d) the upper side wall portion of the containing section having a closure section by which the upper side wall portion can be closed to contain the controlled atmosphere gas, whereby controlled atmosphere gas can be introduced into the chamber to displace gas through the outlet to maintain a desired controlled atmosphere environment in the shipping container.

40. The portable container as recited in claim 39, wherein said outlet is a pressure responsive outlet to discharge gas from the unit at a predetermined pressure level.

41. The portable shipping container as recited in claim 39, wherein said controlled atmosphere container has a base and a collapsible side wall portion with an upper closure portion, whereby said base can be placed on a pallet, with said side wall portion being in a collapsed position, said quantity of product can be placed on the base, the side wall portion of the controlled atmosphere container can be raised and the upper closure portion of said side wall portion can be closed to enclose a controlled atmosphere chamber of said portable container.

42. The portable container as recited in claim 39, further comprising in combination a gas container and a gas regulation unit operatively connected to the portable container to regulate and supply flow of gas from the gas container to the shipping container.

43. The portable container as recited in claim 42, where there are two or more gas containers, each containing a gas component of a gaseous mixture which makes up the controlled atmosphere gas, and said gas regulating unit controls flow of said two or more gas components.

44. The portable container as recited in claim 39, wherein said portable container comprises a flexible inflatable member, which is configured so that when controlled atmosphere gas is directed into said portable container to inflate said controlled atmosphere container, the controlled atmosphere gas is adjacent to substantial outer surface portions of said quantity of product.

45. The portable container as recited in claim 44, wherein said outlet is a pressure responsive outlet to discharge gas from the container at a predetermined pressure level.

46. The portable container as recited in claim 45, wherein there is a second pressure responsive discharge valve to permit discharge of gas therethrough at a pressure higher than the discharge pressure of the discharge valve of claim 45.

* * * * *